(12) United States Patent
Hamanaka

(10) Patent No.: US 8,654,174 B2
(45) Date of Patent: Feb. 18, 2014

(54) IMAGE FORMING APPARATUS AND METHOD OF THE SAME

(75) Inventor: Takahiro Hamanaka, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 342 days.

(21) Appl. No.: 13/171,371

(22) Filed: Jun. 28, 2011

(65) Prior Publication Data

US 2012/0001994 A1    Jan. 5, 2012

Related U.S. Application Data

(60) Provisional application No. 61/360,460, filed on Jun. 30, 2010.

(51) Int. Cl.
*B41J 27/00* (2006.01)
*B41J 2/455* (2006.01)
*B41J 2/47* (2006.01)

(52) U.S. Cl.
USPC ........... 347/261; 347/259; 347/260; 347/233; 347/254

(58) Field of Classification Search
USPC ................... 347/259–261, 233, 254
See application file for complete search history.

(56) References Cited

U.S. PATENT DOCUMENTS

| 6,628,424 B2 * | 9/2003 | Sakurai ........................... 358/1.9 |
| 2005/0207762 A1 * | 9/2005 | Funabiki ......................... 399/15 |

FOREIGN PATENT DOCUMENTS

| JP | 08-258329 A | | 10/1996 |
| JP | 09-54265 A | | 2/1997 |
| JP | 11-352737 A | | 12/1999 |
| JP | 11352737 A | * | 12/1999 |
| JP | 2002-123053 A | | 4/2002 |
| JP | 2005-297392 A | | 10/2005 |

* cited by examiner

*Primary Examiner* — Stephen Meier
*Assistant Examiner* — Sarah Al Hashimi
(74) *Attorney, Agent, or Firm* — Patterson & Sheridan, L.L.P.

(57) ABSTRACT

According to one embodiment, if it is designated by operation of a control panel that a printed halftone image for test is defective, a number of revolutions of a polygon mirror is finely adjusted by a predetermined rate and a frequency of a serial data signal is finely adjusted by the rate.

16 Claims, 5 Drawing Sheets

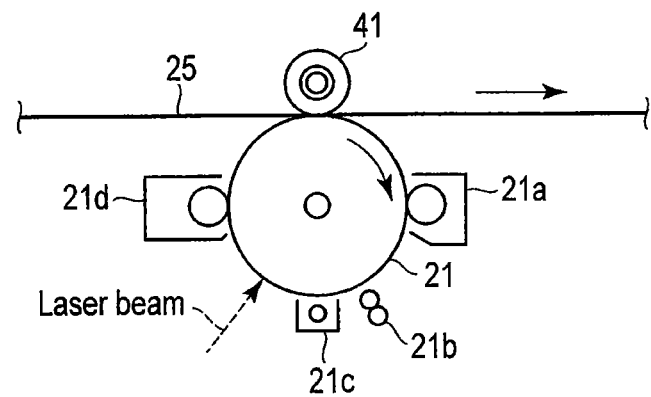
F I G. 2
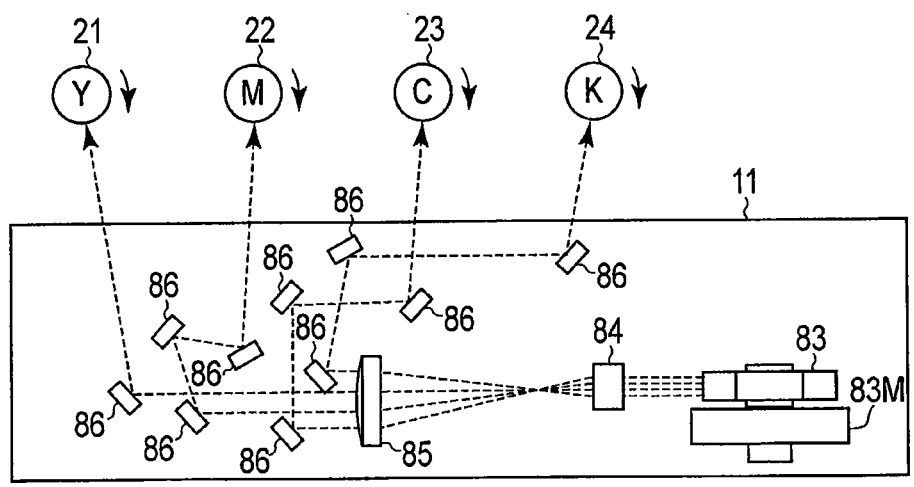
F I G. 3

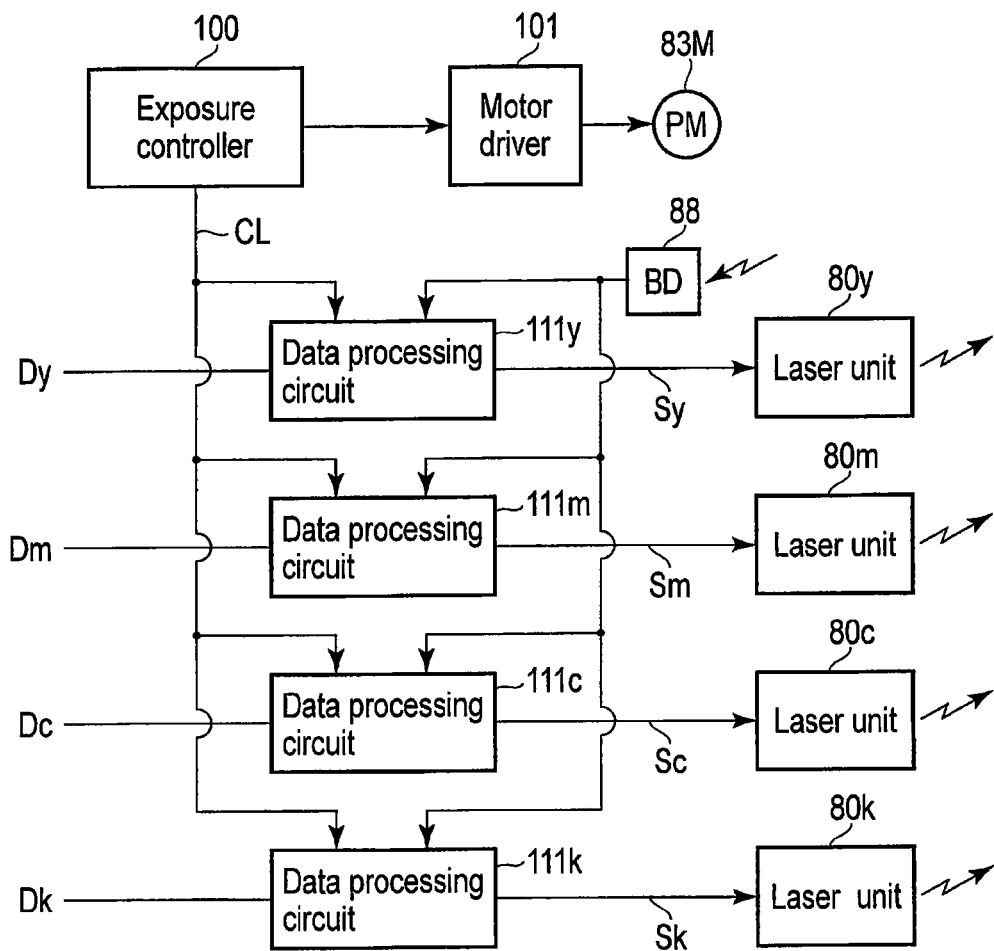
F I G. 6
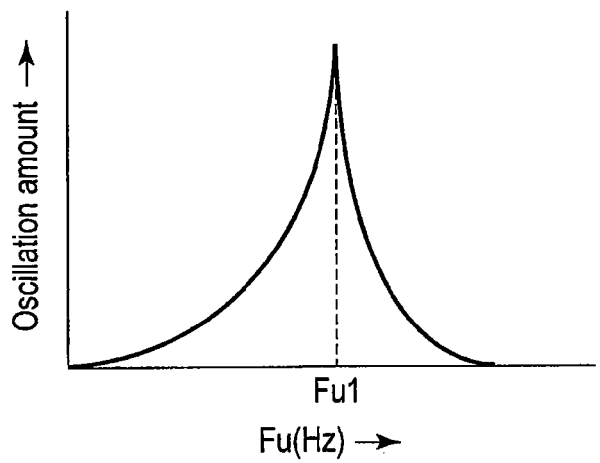
F I G. 7

IMAGE FORMING APPARATUS AND METHOD OF THE SAME

CROSS-REFERENCE TO RELATED APPLICATIONS

This application is based upon and claims the benefit of priority from U.S. provisional applications 61/360,460, filed on Jun. 30, 2010, the entire contents of which are incorporated herein by reference.

FIELD

Embodiments described herein relate generally to an image forming apparatus and a method of the same.

BACKGROUND

An image forming apparatus includes a laser unit configured to emit a laser beam and a rotary polygon mirror configured to reflect the laser beam, which is emitted from the laser unit, to a photoconductive drum. The image forming apparatus exposes and scans the photoconductive drum according to the rotation and the reflection of the polygon mirror to form a latent image on the photoconductive drum, develops the latent image, and prints a developed image on an image formation medium.

If oscillation that occurs in the polygon mirror is large, distortion occurs in a printed image.

BRIEF DESCRIPTION OF THE DRAWINGS

FIG. 2 is a diagram of the configuration of a first photoconductive drum and components around the first photoconductive drum in the embodiment;

FIG. 3 is a diagram of a main part of an exposure unit in the embodiment viewed from a side;

FIG. 6 is a block diagram of a control circuit for the main part;

FIG. 7 is a graph of a relation between an oscillation frequency and an oscillation amount of the exposure unit.

DETAILED DESCRIPTION

In general, according to one embodiment, an image forming apparatus includes a photoconductive drum; an exposure unit including a data processing circuit configured to convert input image data into a serial data signal having a frequency corresponding to a predetermined image formation magnification, a laser unit configured to operate according to the serial data signal converted by the data processing circuit and emit a laser beam for exposure and scanning for the photoconductive drum, and a rotary polygon mirror configured to reflect the laser beam, which is emitted from the laser unit, to the photoconductive drum, the exposure unit main-scanning the photoconductive drum along an axis direction of the photoconductive drum according to the rotation and the reflection of the polygon mirror, performing sub-scanning for repeating the main scanning according to the rotation of the photoconductive drum, and forming a latent image on the photoconductive drum according to the main scanning and the sub-scanning; a processing unit configured to develop the latent image formed on the photoconductive drum and transfer the developed image onto an image formation medium; a control panel for operation; a first control section configured to control, if an adjustment mode is set by operation of the control panel, the photoconductive drum, the exposure unit, and the processing unit to thereby form an image for test on the image formation medium; a second control section configured to finely adjust, if it is designated by operation of the control panel that the image for test formed on the image formation medium is defective, a number of revolutions of the polygon mirror by a predetermined rate and finely adjust the frequency of the serial data signal by the rate and, after the fine adjustment, cause the first control section to perform the formation of the image for test again; and a third control section configured to release the adjustment mode if it is designated by operation of the control panel that the image for test formed on the image formation medium is not defective.

An embodiment is explained below with reference to the accompanying drawings.

Figure 1:
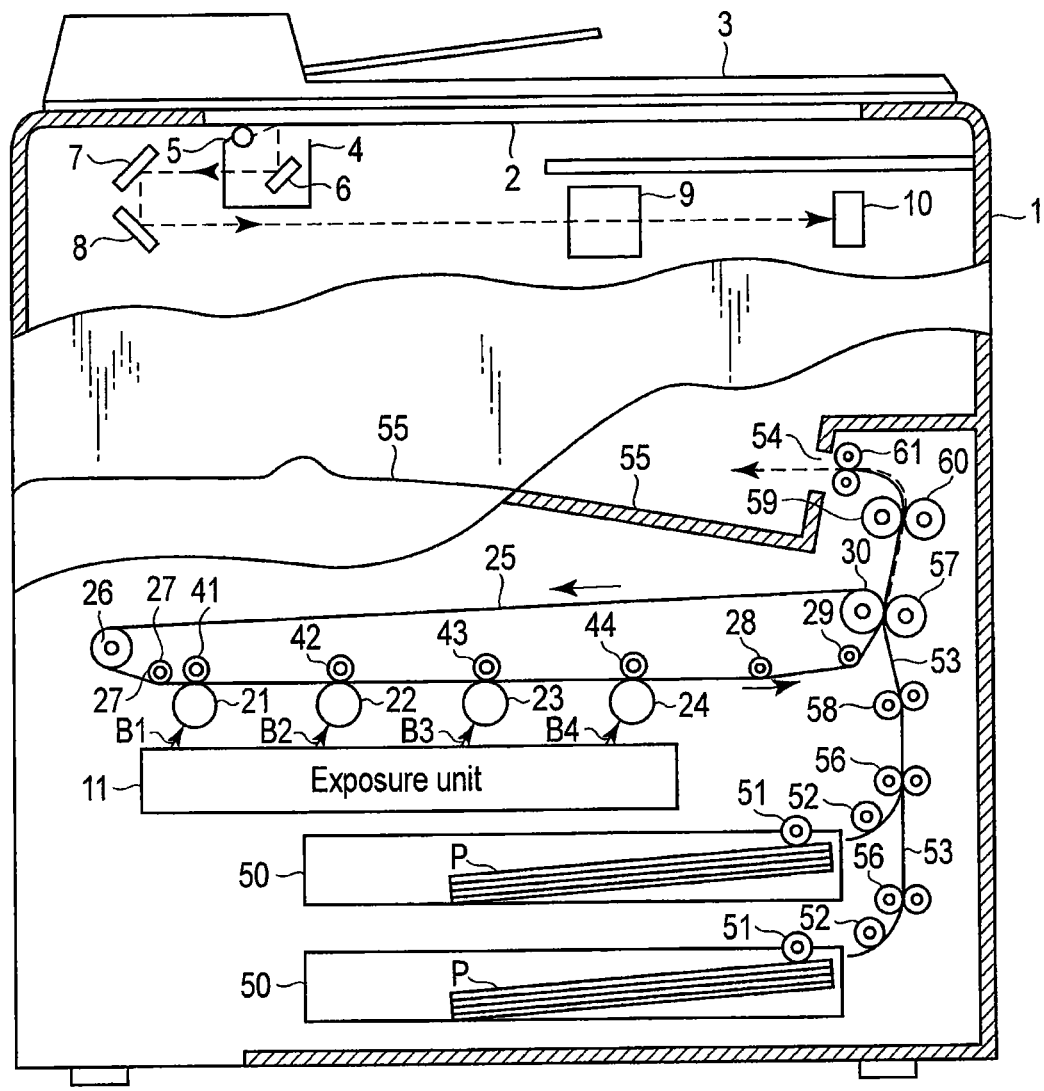
FIG. 1 is a diagram of the configuration of an entire image forming apparatus according to an embodiment.

As shown in FIG. 1, a document table (a glass plate) 2 is arranged in an upper part of an apparatus body 1. A cover 3 is arranged on the document table 2. A carriage 4 is arranged on the lower surface side of the document table 2. An exposure lamp 5 is arranged on the carriage 4. The carriage 4 reciprocatingly moves along the lower surface of the document table 2. The exposure lamp 5 is turned on while the carriage 4 moves forward, whereby an original document on the document table 2 is exposed to light. An image of the original document is optically read by the exposure. The read image is projected on a CCD 10 via reflection mirrors 6, 7, and 8 and a lens block 9. The CCD 10 outputs an image signal corresponding to the read image.

The image signal output from the CCD 10 is processed by an image processing section 95 explained later and converted into image data. The image data is supplied to an exposure unit 11. The exposure unit 11 exposes and scans, with four laser beams, a photoconductive drum for yellow image formation (a first photoconductive drum) 21, a photoconductive drum for magenta image formation (a second photoconductive drum) 22, a photoconductive drum for cyan image formation (a third photoconductive drum) 23, and a photoconductive drum for black image formation (a fourth photoconductive drum) 24, respectively.

A transfer belt 25 is arranged on the photoconductive drums 21, 22, 23, and 24. The transfer belt 25 is laid over a drive roller 26 and a driven roller 30. The transfer belt 25 receives power from the drive roller 26 and rotates in the counterclockwise direction.

Primary transfer rollers 41, 42, 43, and 44 are arranged to freely move up and down in positions opposed to the photoconductive drums 21, 22, 23, and 24. The primary transfer rollers 41, 42, 43, and 44 are displaced (lowered) to the transfer belt 25 side to thereby rotate while bringing the transfer belt 25 into contact with the photoconductive drums 21, 22, 23, and 24 and transfers visible images on the photoconductive drums 21, 22, 23, and 24 onto the transfer belt 25.

The configuration of the photoconductive drum 21 and components around the photoconductive drum 21 is shown in FIG. 2. A cleaner 21a, a charge removing lamp 21b, a charging unit 21c, and a yellow developing unit 21d are arranged around the photoconductive drum 21. The cleaner 21a removes a development material remaining on the surface of the photoconductive drum 21. The charge removing lamp 21b removes charges remaining on the surface of the photoconductive drum 21. The charging unit 21c applies a high voltage to the photoconductive drum 21 to thereby charge the surface of the photoconductive drum 21 with electrostatic charges. The charged surface of the photoconductive drum 21 is exposed and scanned by the exposure unit 11, whereby an electrostatic latent image is formed on the surface of the photoconductive drum 21. The developing unit 21d supplies a yellow development material (toner) to the surface of the photoconductive drum 21 to thereby develop the electrostatic latent image on the surface of the photoconductive drum 21 in yellow and visualize the electrostatic latent image.

The configurations of the other photoconductive drums 22, 23, and 24 and components around the photoconductive drums 22, 23, and 24 are the same. Therefore, explanation of the configurations is omitted.

Plural paper feeding cassettes 50 are arranged below the exposure unit 11. The paper feeding cassettes 50 store paper sheets P, which are image formation media. The paper sheet P picked up from the paper feeding cassettes 50 is supplied to a conveying path 53. The conveying path 53 extends to a paper discharge port 54 through the driven roller 30. The paper discharge port 54 faces a paper discharge tray 55.

A secondary transfer roller 57 is arranged, across the transfer belt 25, in a position in the conveying path 53 opposed to the driven roller 30. A registration roller 58 is arranged in a position before the driven roller 30 and the secondary transfer roller 57. The registration roller 58 feeds the paper sheet P into a space between the transfer belt 25 and the secondary transfer roller 57. The secondary transfer roller 57 transfers a visible image, which is transferred on the transfer belt 25, onto the paper sheet P fed from the registration roller 58. A heat roller 59, a pressing roller 60, and a paper discharge roller 61 are arranged at the terminal end of the conveying path 53.

Figure 4:
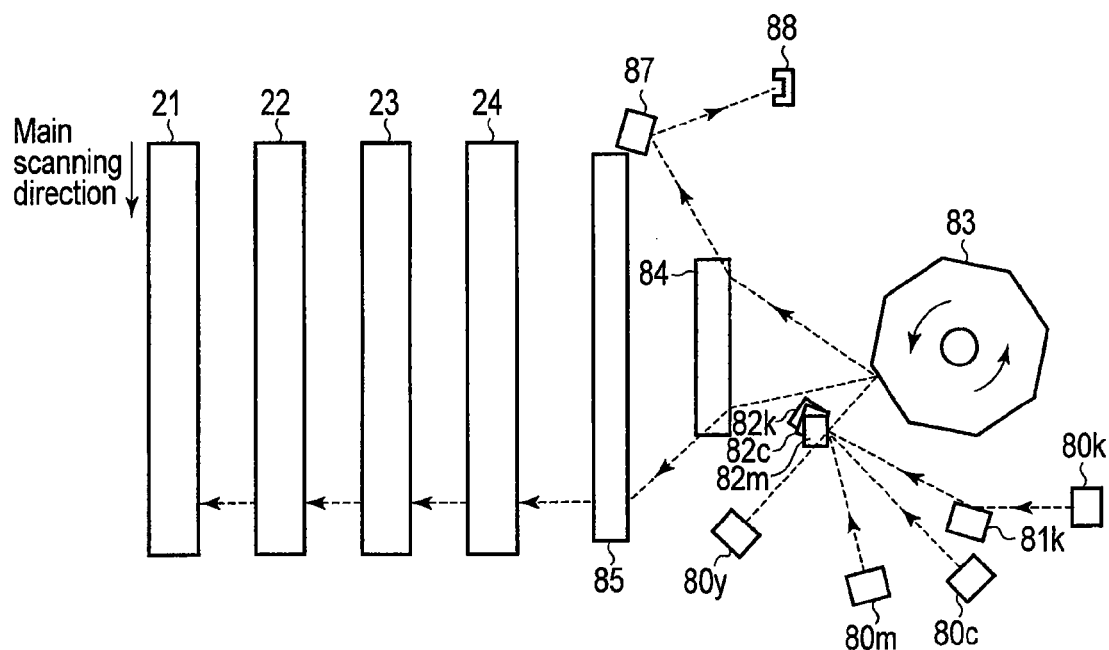
FIG. 4 is a diagram of the main part viewed from above.

A main part of the exposure unit 11 is shown in FIGS. 3 and 4. FIG. 3 is a diagram of the exposure unit 11 viewed from a side. FIG. 4 is a diagram of the exposure unit 11 viewed from above.

A laser beam emitted from a laser unit for yellow image formation (a first laser unit) 80y is irradiated on a rotary polygon mirror 83. The polygon mirror 83 rotates with the power of a polygon motor 83M and reflects the laser beam, which is irradiated from the laser unit 80y, to the photoconductive drum 21. The reflected laser beam is irradiated on the photoconductive drum 21 via lenses 84 and 85 and plural mirrors 86. The photoconductive drum 21 is main-scanned along the axis direction of the photoconductive drum 21 according to the rotation and the reflection of the polygon mirror 83. This main scanning is repeated according to the rotation of the photoconductive drum 21. The repetition of the main scanning is sub-scanning. An electrostatic latent image for yellow image is formed on the photoconductive drum 21 by the main scanning and the sub-scanning.

During the start of the main scanning, the laser beam emitted from the laser unit 80y is irradiated on a laser detection unit 88 via the polygon mirror 83, the lens 84, and a mirror 87. The laser detection unit 88 detects the irradiated laser beam as a reference position of the main scanning.

A laser beam emitted from a laser unit for magenta image formation (a second laser unit) 80m is irradiated on the polygon mirror 83. The polygon mirror 83 reflects the laser beam, which is irradiated from the laser unit 80m, to the photoconductive drum 22. The reflected laser beam is irradiated on the photoconductive drum 22 via the lenses 84 and 85 and the plural mirrors 86. The photoconductive drum 22 is main-scanned along the axis direction of the photoconductive drum 22 according to the rotation and the reflection of the polygon mirror 83. This main scanning is repeated according to the rotation of the photoconductive drum 22. The repetition of the main scanning is sub-scanning. An electrostatic latent image for magenta image is formed on the photoconductive drum 22 by the main scanning and the sub-scanning.

A laser beam emitted from a laser unit for cyan image formation (a third laser unit) 80c is irradiated on the polygon mirror 83. The polygon mirror 83 reflects the laser beam, which is irradiated from the laser unit 80c, to the photoconductive drum 23. The reflected laser beam is irradiated on the photoconductive drum 23 via the lenses 84 and 85 and the plural mirrors 86. The photoconductive drum 23 is main-scanned along the axis direction of the photoconductive drum 23 according to the rotation and the reflection of the polygon mirror 83. This main scanning is repeated according to the rotation of the photoconductive drum 23. The repetition of the main scanning is sub-scanning. An electrostatic latent image for cyan image is formed on the photoconductive drum 23 by the main scanning and the sub-scanning.

A laser beam emitted from a laser unit for black image formation (a fourth laser unit) 80k is irradiated on the polygon mirror 83. The polygon mirror 83 reflects the laser beam, which is irradiated from the laser unit 80k, to the photoconductive drum 24. The reflected laser beam is irradiated on the photoconductive drum 24 via the lenses 84 and 85 and the plural mirrors 86. The photoconductive drum 24 is main-scanned along the axis direction of the photoconductive drum 24 according to the rotation and the reflection of the polygon mirror 83. This main scanning is repeated according to the rotation of the photoconductive drum 24. The repetition of the main scanning is sub-scanning. An electrostatic latent image for black image is formed on the photoconductive drum 24 by the main scanning and the sub-scanning.

Figure 5:
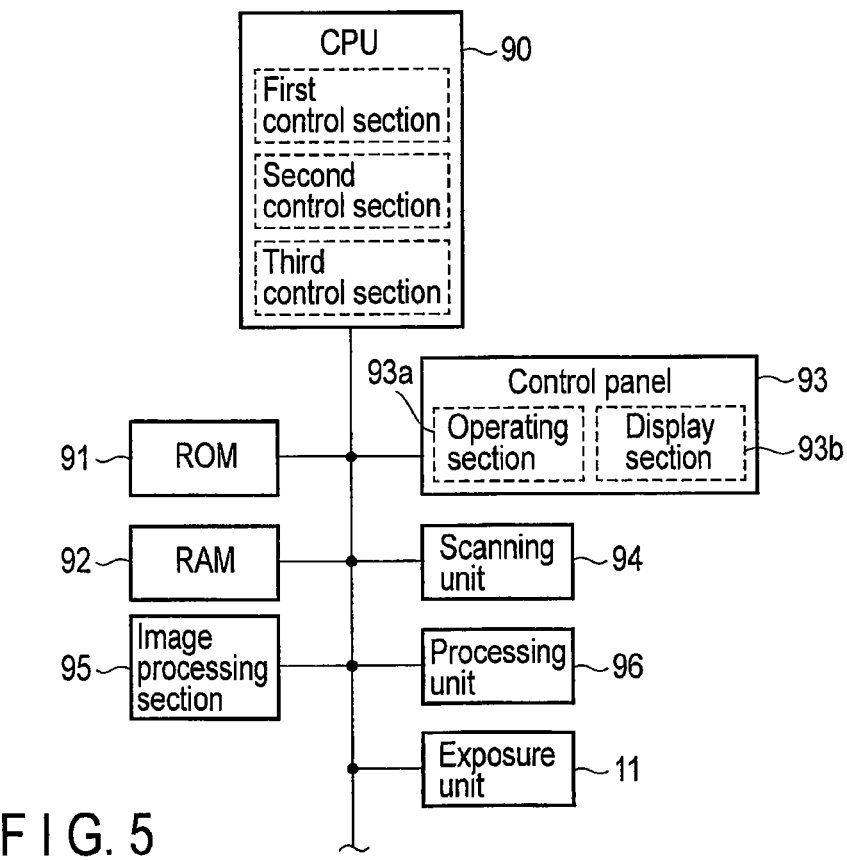
FIG. 5 is a block diagram of a control circuit of the embodiment.

A control circuit for the apparatus body 1 is shown in FIG. 5.

A ROM 91, a RAM 92, a control panel 93, a scanning unit 94, the image processing section 95, a processing unit 96, and the exposure unit 11 are connected to a CPU 90, which is a main control section.

The control panel 93 includes an operating section 93a that can be operated by a user and a display section 93b for data display to the user. The scanning unit 94 includes the carriage 4, the exposure lamp 5, the reflection mirrors 6, 7, and 8, the lens block 9, and the CCD 10. The scanning unit 94 optically reads an image of the original document. The image processing section 95 processes the image read by the scanning unit 94 to thereby output yellow image data Dy, magenta image data Dm, cyan image data Dc, and black image data Dk. This output is input to the exposure unit 11.

The processing unit 96 includes the photoconductive drums 21, 22, 23, and 24, the transfer belt 25, the drive roller 26, the driven roller 30, the primary transfer roller 41, 42, 43, and 44, and the secondary transfer roller 57. The processing unit 96 develops electrostatic latent images formed on the photoconductive drums 21, 22, 23, and 24 and transfers (prints) the developed images onto the paper sheet P.

The exposure unit 11 includes the configuration shown in FIGS. 3 and 4 and includes an exposure controller 100, a motor driver 101, and data processing circuits 111y, 111m, 111c, and 111k shown in FIG. 6. The exposure controller 100 controls the motor driver 101 and the data processing circuit 111y, 111m, 111c, and 111k according to a command from the CPU 90. The motor driver 101 drives the polygon motor 83M according to a command from the exposure controller 100.

The data processing circuit (a first data processing circuit) 111y converts the input yellow image data Dy into a serial data signal Sy having pulse width corresponding to density represented by the yellow image data Dy and a frequency corresponding to an image clock signal CL supplied from the exposure controller 100. The data processing circuit lily outputs the serial data signal Sy in synchronization with a detection signal of the laser detection unit 88.

The data processing circuit (a second data processing circuit) 111m converts the input magenta image data Dm into a serial data signal Sm having pulse width corresponding to density represented by the magenta image data Dm and the frequency corresponding to the image clock signal CL supplied from the exposure controller 100. The data processing circuit 111m outputs the serial data signal Sm in synchronization with a detection signal of the laser detection unit 88.

The data processing circuit (a third data processing circuit) 111c converts the input cyan image data Dc into a serial data signal Sc having pulse width corresponding to density represented by the cyan image data Dc and the frequency corresponding to the image clock signal CL supplied from the exposure controller 100. The data processing circuit 111c outputs the serial data signal Sc in synchronization with a detection signal of the laser detection unit 88.

The data processing circuit (a fourth data processing circuit) 111k converts the input black image data Dk into a serial data signal Sk having pulse width corresponding to density represented by the black image data Dk and the frequency corresponding to the image clock signal CL supplied from the exposure controller 100. The data processing circuit 111k outputs the serial data signal Sk in synchronization with a detection signal of the laser detection unit 88.

The frequency of the image clock signal CL corresponds to an image formation magnification set in the control panel 93. If the image formation magnification set in the control panel 93 is increased, the frequency of the image clock signal CL is reduced. The frequency of the serial data signals Sy, Sm, Sc, and Sk falls according to the reduction in the frequency of the image clock signal CL. If the image formation magnification set in the control panel 93 is reduced, the frequency of the image clock signal CL is increased. The frequency of the serial data signals Sy, Sm, Sc, and Sk rises according to the increase in the frequency of the image clock signal CL.

The laser unit 80y operates according to the serial data signal Sy and emits a laser beam for exposure and scanning for the photoconductive drum 21. The laser unit 80m operates according to the serial data signal Sm and emits a laser beam for exposure and scanning for the photoconductive drum 22. The laser unit 80c operates according to the serial data signal Sc and emits a laser beam for exposure and scanning for the photoconductive drum 23. The laser unit 80k operates according to the serial data signal Sk and emits a laser beam for exposure and scanning for the photoconductive drum 24.

The CPU 90 includes, as main functions, sections (1) to (3) explained below.

(1) A first control section configured to control, if an adjustment mode is set by operation of the control panel 93, the photoconductive drums 21, 22, 23, and 24, the exposure unit 11, and the processing unit 96 to thereby separately form plural color images for test on each of the paper sheets P. Specifically, the first control section forms a yellow halftone image for test on one paper sheet P, forms a magenta halftone image for test on another one paper sheet P, forms a cyan halftone image for test on still another one paper sheet P, and forms a black halftone image for test on still another one paper sheet P.

(2) A second control section that finely adjusts, if it is designated by operation of the control panel 93 that at least one of the color halftone images formed on the paper sheets P is defective, the number of revolutions of the polygon mirror 83 (=the number of revolutions of the polygon motor 83M) by a predetermined rate, for example, $\alpha$ % and finely adjusts the frequency of the serial data signals Sy, Sm, Sc, and Sk (=the frequency of the image clock signal CL) by the rate $\alpha$ % and, after the fine adjustment, causes the first control section to perform the formation of color halftone images again.

(3) A third control section that releases the adjustment mode if it is designated by operation of the control panel 93 that the color halftone images formed on the paper sheets P are not defective.

Figure 8:
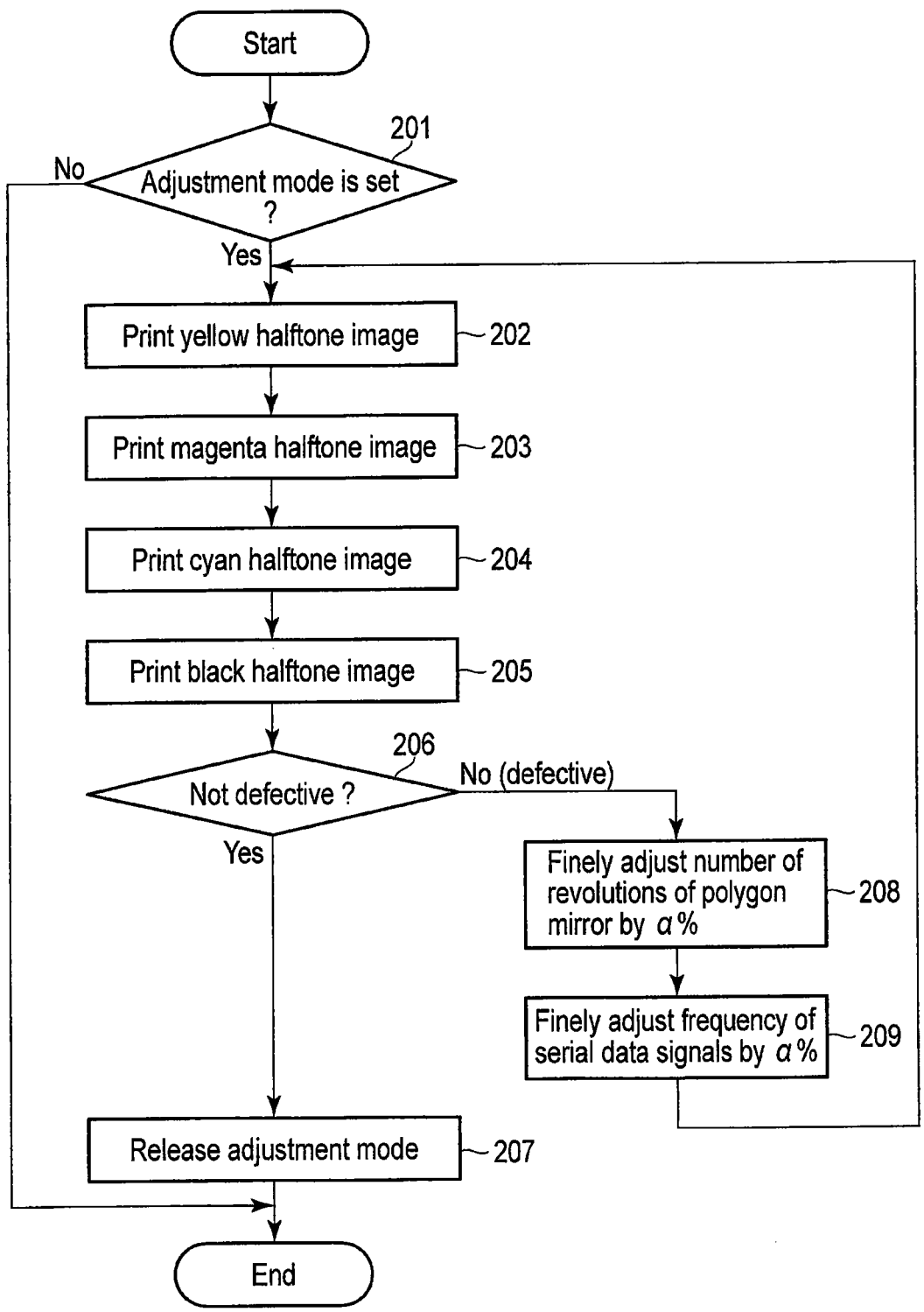
FIG. 8 is a flowchart for explaining control in the embodiment.

Occurrence of distortion in a print image due to oscillation of the polygon mirror 83 is explained with reference to FIG. 7. Control by the CPU 90 is explained with reference to FIG. 8.

During print, oscillation occurs in the exposure unit 11 and oscillation involved in rotation of the polygon mirror 83 in the exposure unit 11 occurs in the polygon mirror 83. A relation between an oscillation frequency Fu (Hz) of the exposure unit 11 and an oscillation amount is shown in FIG. 7. The oscillation frequency Fu (Hz) of the exposure unit 11 has a resonance point Fu1 (Hz) where the oscillation amount is maximized. As an oscillation frequency Fm (Hz) of the polygon mirror 83 is closer to the resonance point Fu1 (Hz), the oscillation amount of the polygon mirror 83 is larger. If the oscillation amount of the polygon mirror 83 is large, distortion occurs in an image printed on the paper sheet P.

The oscillation frequency Fm (Hz) of the polygon mirror 83 changes according to the number of revolutions $\omega$ (rpm) of the polygon mirror 83. Fm(Hz)=$\omega$/60.

If the control panel 93 is operated by the user and the adjustment mode is set (YES in Act 201), the CPU 90 prints a yellow halftone image for test on one paper sheet P (Act 202), prints a magenta halftone image for test on another one paper sheet P (Act 203), prints a cyan halftone image for test on still another one paper sheet P (Act 204), and prints a black halftone image for test on still another one paper sheet P (Act 205).

The user checks each of the printed halftone images on the paper sheets P. If all the color halftone images on the paper sheets P are not defective, the user designates by operating the control panel 93 that the color halftone images are not defective. If it is designated that the color halftone images are not defective (YES in Act 206), the CPU 90 releases the adjustment mode (Act 207).

If an oscillation amount of the polygon mirror 83 is large, distortion occurs in any one of the printed halftone images on the paper sheets P. If there is distortion in at least one of the color halftone images on the paper sheets P, for example, if there is distortion in the yellow halftone image and the black halftone image, the user designates by operating the control panel 93 that the color halftone images are defective. If it is designated that the color halftone images are defective (NO in Act 206), the CPU 90 finely adjusts the number of revolutions $\omega$ (rpm) of the polygon mirror 83 by a predetermined rate, for example, $\alpha$ % (Act 208) and finely adjusts the frequency of the serial data signal Sy, Sm, Sc, and Sk by the same rate $\alpha$ % (Act 209). After the fine adjustment, the CPU 90 performs the formation of color halftone images again (Acts 202, 203, 204, and 205).

The user checks each of the printed halftone images on the paper sheets P in the same manner as explained above. If both the distortion of the yellow halftone image and the distortion of the black halftone image are eliminated, the user designates by operating the control panel 93 that the color halftone images are not defective. If it is designated that the color halftone images are not defective (YES in Act 206), the CPU 90 releases the adjustment mode (Act 207).

Even if the distortion of the yellow halftone image is eliminated, if the distortion remains in the black halftone image, the user designates again by operating the control panel 93 that the color halftone images are defective. If it is designated that the color halftone images are defective (NO in Act 206), the CPU 90 further finely adjusts the number of revolutions ω (rpm) of the polygon mirror 83 by α % (Act 208) and further finely adjusts the frequency of the serial data signals Sy, Sm, Sc, and Sk by α % (Act 209). After the fine adjustment, the CPU 90 performs the formation of color halftone images again (Acts 202, 203, 204, and 205).

The user checks each of the printed halftone images on the paper sheets P in the same manner as explained above. If the distortion of the black halftone image is also eliminated, the user designates by operating the control panel 93 that the color halftone images are not defective. The CPU 90 releases the adjustment mode on the basis of this designation (YES in Act 206) (Act 207).

If the number of revolutions ω (rpm) of the polygon mirror 83 is finely adjusted, the oscillation frequency Fm (Hz) of the polygon mirror 83 changes. As the oscillation frequency Fm (Hz) is farther away from the resonance point Fu1 (Hz) of the oscillation frequency Fu (Hz) of the exposure unit 11, the oscillation amount of the polygon mirror 83 decreases. If the oscillation amount of the polygon mirror 83 decreases, the distortion of the printed color halftone image is eliminated. A direction of the fine adjustment of the number of revolutions ω (rpm) of the polygon mirror 83 may be either an increasing direction or a decreasing direction.

However, if the number of revolutions ω (rpm) of the polygon mirror 83 is finely adjusted, an error occurs in an image formation magnification in the main scanning direction of the colors. For example, if the number of revolutions ω (rpm) of the polygon mirror 83 is finely adjusted in the increasing direction, the image formation magnification in the main scanning direction shifts to an increasing direction in all the four colors. If the number of revolutions ω (rpm) of the polygon mirror 83 is finely adjusted in the decreasing direction, the image formation magnification in the main scanning direction shifts in a decreasing direction in all the four colors.

Therefore, the CPU 90 finely adjusts, every time the number of revolutions ω (rpm) of the polygon mirror 83 is finely adjusted by α %, the frequency of the serial data signals Sy, Sm, Sc, and Sk by the same α %. For example, the CPU 90 finely adjusts, every time the number of revolutions ω (rpm) of the polygon mirror 83 is finely adjusted by α % in the increasing direction, the frequency of the serial data signals Sy, Sm, Sc, and Sk by the same α % in the decreasing direction. Alternatively, the CPU 90 finely adjusts, every time the number of revolutions ω (rpm) of the polygon mirror 83 is finely adjusted by α % in the decreasing direction, the frequency of the serial data signals Sy, Sm, Sc, and Sk by the same α % in the increasing direction. An error in the image formation magnification in the main scanning direction is prevented by the fine adjustment.

With the simple operation for only setting the adjustment mode in the control panel 93 and designating presence or absence of defects, it is possible to eliminate distortion of printed images and prevent an error in the image formation magnification in the main scanning direction of the colors. Therefore, it is possible to substantially reduce work load on the user.

In the adjustment mode, it is also possible to eliminate a striped pattern (woody) image that occurs when the number of revolutions of the polygon mirror 83 and an image signal frequency resonate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
a photoconductive drum;
an exposure unit including a data processing circuit configured to convert input image data into a serial data signal having a frequency corresponding to a predetermined image formation magnification, a laser unit configured to operate according to the serial data signal converted by the data processing circuit and emit a laser beam for exposure and scanning for the photoconductive drum, and a rotary polygon mirror configured to reflect the laser beam, which is emitted from the laser unit, to the photoconductive drum, the exposure unit main-scanning the photoconductive drum along an axis direction of the photoconductive drum according to the rotation and the reflection of the polygon mirror, performing sub-scanning for repeating the main scanning according to the rotation of the photoconductive drum, and forming a latent image on the photoconductive drum according to the main scanning and the sub-scanning;
a processing unit configured to develop the latent image formed on the photoconductive drum and transfer the developed image onto an image formation medium;
a control panel for operation;
a first control section configured to control, if an adjustment mode is set by operation of the control panel, the photoconductive drum, the exposure unit, and the processing unit to thereby form an image for test on the image formation medium;
a second control section configured to finely adjust, if it is designated by operation of the control panel that the image for test formed on the image formation medium is defective, a number of revolutions of the polygon mirror by a predetermined rate and finely adjust the frequency of the serial data signal by the rate and, after the fine adjustment, cause the first control section to perform the formation of the image for test again; and
a third control section configured to release the adjustment mode if it is designated by operation of the control panel that the image for test formed on the image formation medium is not defective.

2. The apparatus of claim 1, wherein the data processing circuit converts the input image data into a serial data signal having pulse width corresponding to density represented by the image data and the frequency corresponding to the predetermined image formation magnification.

3. The apparatus of claim 1, wherein the image for test is a halftone image.

4. The apparatus of claim 1, wherein
the photoconductive drum is plural photoconductive drums for color image formation,
the data processing circuit is plural data processing circuit for color image formation, and
the laser unit is plural laser units for color image formation.

5. The apparatus of claim 1, wherein the control panel includes an operating section and a display section.

6. An image forming apparatus comprising:
plural photoconductive drums for color image formation;
an exposure unit including plural data processing circuits configured to respectively convert input image data of colors into serial data signals having a frequency corresponding to a predetermined image formation magnification, plural laser units configured to respectively operate according to the serial data signals converted by the data processing circuits and emit laser beams for exposure and scanning for the photoconductive drums, and a rotary polygon mirror configured to reflect the laser beams, which are emitted from the laser units, to the photoconductive drums, the exposure unit main-scanning the photoconductive drums along an axis direction of the photoconductive drums according to the rotation and the reflection of the polygon mirrors, performing sub-scanning for repeating the main scanning according to the rotation of the photoconductive drums, and forming latent images on the photoconductive drums according to the main scanning and the sub-scanning;
a processing unit configured to develop the latent images formed on the photoconductive drums and transfer the developed images onto paper sheets;
a control panel for operation;
a first control section configured to control, if an adjustment mode is set by operation of the control panel, the photoconductive drums, the exposure unit, and the processing unit to thereby separately form images of plural colors for test on each of the paper sheets;
a second control section configured to finely adjust, if it is designated by operation of the control panel that at least one of the color images formed on the paper sheets is defective, a number of revolutions of the polygon mirror by a predetermined rate and finely adjust the frequency of the serial data signals by the rate and, after the fine adjustment, cause the first control section to perform the formation of the images of plural colors again; and
a third control section configured to release the adjustment mode if it is designated by operation of the control panel that the color images formed on the paper sheets are not defective.

7. The apparatus of claim 6, wherein the plural photoconductive drums are a first photoconductive drum for yellow image formation, a second photoconductive drum for magenta image formation, a third photoconductive drum for cyan image formation, and a fourth photoconductive drum for black image formation.

8. The apparatus of claim 7, wherein the plural data processing circuits are a first data processing circuit configured to convert input yellow image data into a first serial data signal having pulse width corresponding to density represented by the yellow image data and the frequency corresponding to the predetermined image formation magnification, a second data processing circuit configured to convert input magenta image data into a second serial data signal having pulse width corresponding to density represented by the magenta image data and the frequency corresponding to the predetermined image formation magnification, a third data processing circuit configured to convert input cyan image data into a third serial data signal having pulse width corresponding to density represented by the cyan image data and the frequency corresponding to the predetermined image formation magnification, and a fourth data processing circuit configured to convert input black image data into a fourth serial data signal having pulse width corresponding to density represented by the black image data and the frequency corresponding to the predetermined image formation magnification.

9. The apparatus of claim 8, wherein the plural laser units are a first laser unit configured to operate according to the first serial data signal and emit a laser beam for exposure and scanning for the first photoconductive drum, a second laser unit configured to operate according to the second serial data signal and emit a laser beam for exposure and scanning for the second photoconductive drum, a third laser unit configured to operate according to the third serial data signal and emit a laser beam for exposure and scanning for the third photoconductive drum, and a fourth laser unit configured to operate according to the fourth serial data signal and emit a laser beam for exposure and scanning for the fourth photoconductive drum.

10. The apparatus of claim 9, wherein the first control section controls, if the adjustment mode is set by operation of the control panel, the photoconductive drums, the exposure unit, and the processing unit to thereby form a yellow halftone image for test on one piece of the paper sheet, form a magenta halftone image for test on another one piece of the paper sheet, form a cyan halftone image for test on still another one piece of the paper sheet, and form a black halftone image for test on still another one piece of the paper sheet.

11. The apparatus of claim 6, wherein the control panel includes an operation section and a display section.

12. A control method for an image forming apparatus including:
a photoconductive drum;
an exposure unit including a data processing circuit configured to convert input image data into a serial data signal having a frequency corresponding to a predetermined image formation magnification, a laser unit configured to operate according to the serial data signal converted by the data processing circuit and emit a laser beam for exposure and scanning for the photoconductive drum, and a rotary polygon mirror configured to reflect the laser beam, which is emitted from the laser unit, to the photoconductive drum, the exposure unit main-scanning the photoconductive drum along an axis direction of the photoconductive drum according to the rotation and the reflection of the polygon mirror, performing sub-scanning for repeating the main scanning according to the rotation of the photoconductive drum, and forming a latent image on the photoconductive drum according to the main scanning and the sub-scanning;
a processing unit configured to develop the latent image formed on the photoconductive drum and transfer the developed image onto an image formation medium; and
a control panel for operation,
the control method comprising:
controlling, if an adjustment mode is set by operation of the control panel, the photoconductive drum, the exposure unit, and the processing unit to thereby form an image for test on the image formation medium;
finely adjusting, if it is designated by operation of the control panel that the image for test formed on the image formation medium is defective, a number of revolutions of the polygon mirror by a predetermined rate and finely adjusting the frequency of the serial data signal by the rate and, after the fine adjustment, causing the first control section to perform the formation of the image for test again; and
releasing the adjustment mode if it is designated by operation of the control panel that the image for test formed on the image formation medium is not defective.

13. The method of claim 12, wherein the data processing circuit converts the input image data into a serial data signal having pulse width corresponding to density represented by the image data and the frequency corresponding to the predetermined image formation magnification.

14. The method of claim 12, wherein the image for test is a halftone image.

15. The method of claim 12, wherein
   the photoconductive drum is plural photoconductive drums for color image formation,
   the data processing circuit is plural data processing circuit for color image formation, and
   the laser unit is plural laser units for color image formation.

16. The method of claim 12, wherein the control panel includes an operating section and a display section.

* * * * *